May 28, 1929.    F. T. GENTILE    1,714,865
MIXER FOR DRINKS
Filed May 24, 1927

INVENTOR.
Frank T. Gentile
BY
ATTORNEYS.

Patented May 28, 1929.

1,714,865

UNITED STATES PATENT OFFICE.

FRANK T. GENTILE, OF BROOKLYN, NEW YORK.

MIXER FOR DRINKS.

Application filed May 24, 1927. Serial No. 193,768.

My invention relates to a drink mixing device particularly useful for soda fountains where it is desired to mix several drinks at one time.

The object of the invention is to provide an exceedingly simple and efficient drink mixing device whereby a number of drinks may be mixed at one time, and whereby only such mixing devices as are actually in use will be in motion. These and various other objects will be clear to anyone skilled in this art from a reading of the following description, and an examination of the accompanying drawings.

Figure 1:
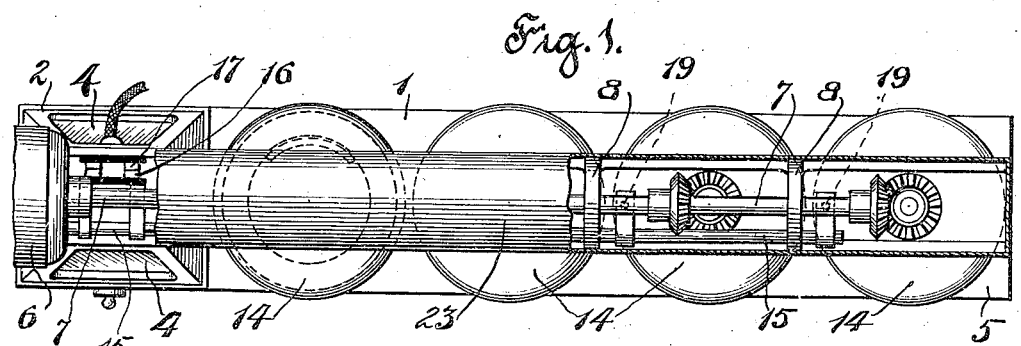
Figure 2:
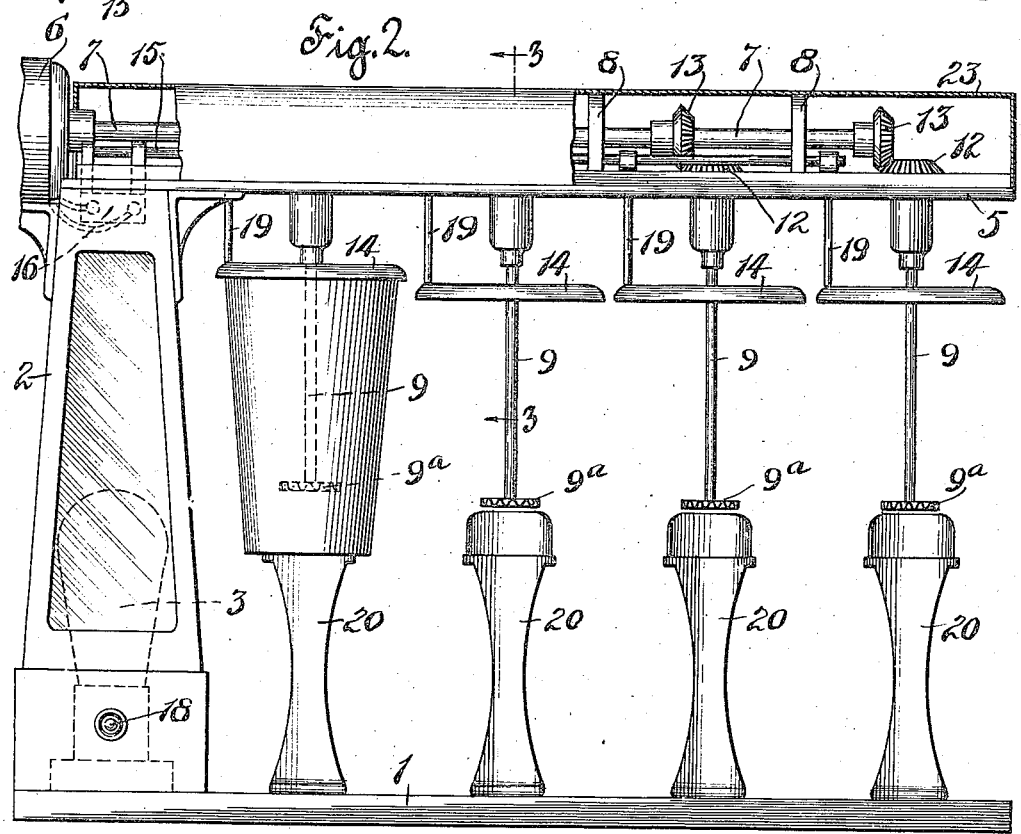
Figures 3, 4:
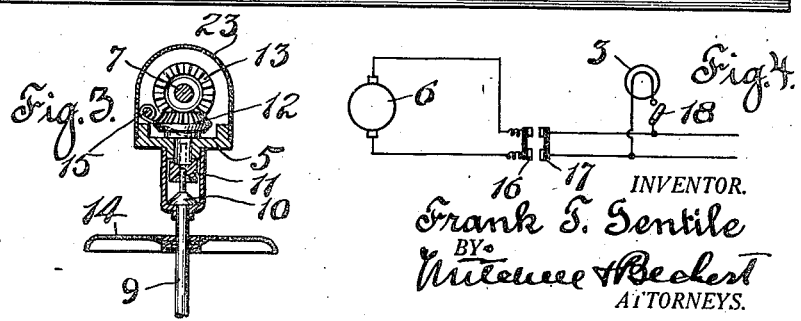

Fig. 1 is a plan view partly in section, and on a reduced scale, of my said drink mixing device;

Fig. 2 is a front elevation partly in section;
Fig. 3 is a section on the line 3—3 of Fig. 2;
Fig. 4 is a diagram of a circuit.

1 is an ordinary base. 2 is a pedestal, preferably hollow and having an electric light therein, as indicated in dotted lines at 3, so that light will shine through a window 4, which may bear thereon any desired legend or advertising device. 5 is a laterally extending arm at the upper end of the pedestal 2. 6 is an electric motor. 7 is a shaft connected with and driven by the motor 6 and mounted in suitable bearings 8 on the arm 5. 9—9 are a series of spindles (four being shown), which are suspended from the arm 5, and provided at the lower ends with mixer heads 9ª. At the upper end of each of these spindles 9 is a suitable clutch member 10 which may be of any desired construction, and which is designed to coact with another clutch member 11 rotatably mounted in the arm 5. At the upper end of the clutch member is a bevel gear 12. 13 is a bevel gear on the shaft 7. Each spindle 9 is equipped with the aforesaid clutch mechanism associated with bevel gears as described. On each spindle 9 is rotatably mounted a cover disk 14. 15 is a rock shaft mounted on the upper side of the arm 5 and carrying at one end a movable part of a circuit closer 16, the same being constructed to coact with the stationary part 17 of the circuit closer. As the shaft 15 is rocked to and fro, it will open and close an electric circuit through the circuit closer parts 16—17. This circuit closing means is suitably connected with any desired source of electric energy, and with the motor 6 and the lamp 3. If desired, an additional lamp controlling switch 18 may be provided in said circuit. 19 is a pin suitably connected with the rock shaft 15 and projecting downwardly through the arm 5 so as to stand above one of the disks 14. A similar pin is provided for each disk. 20—20 are standards for supporting the cup containing the beverage, one cup being illustrated at 21. 23 is a cover for the mechanism mounted on the arm 5.

*Operation.*

With the parts standing as shown in the drawings, one cup 21 stands in place so that the contents of the cup will be agitated by the mixer head. It will be noted that the lower end of this cup rests on one of the standards 20, while the upper end is engaged under one of the cover disks 14 and has lifted the same somewhat. This lifting of the disk 14 not only lifts the spindle 9, associated therewith, so that the clutch elements 10 and 11 associated with said spindle will be brought into operative or driving engagement, but, at the same time, it has lifted one of the pins 19 so as to rock the shaft 15 and close the circuit, thereby causing current to flow through the motor 6 so as to revolve the shaft 7. This causes the several bevel gears to revolve, but only that spindle projecting into the cup aforesaid will be caused to revolve because the other three clutch mechanisms are manifestly out of engagement, or separated, as shown in Fig. 3. Assuming the cup 21 (shown in Fig. 2) contains a beverage, it is manifest that the mixer head in said cup will be rapidly revolved, and will cause the beverage to be agitated and thoroughly mixed. Should there be an order for two, three, or four drinks, which are to be mixed at the same time, the operator has simply to insert the other glasses into the mixing position with relation to the other spindles, and, simultaneously with the act of inserting said glasses, the clutch mechanisms for the respective spindles will be caused to engage, whereby these spindles will be turned until the mixing is completed and the cups are removed. When the last cup is removed, the rock shaft 15 will swing back to its normal "off" position, so as to open the circuit, whereupon the motor will stop. It is ordinarily desirable to have the lamp 3 controlled by a separate switch so that, even when the motor is stopped, the lamp 3 within the transparent pedestal may still glow, this being accomplished by putting the lamp circuit in parallel with the motor circuit as conventionally illustrated in Fig. 4.

What I claim is:

1. In a drink mixer, a driving shaft, a plurality of clutch members driven thereby, a plurality of mixer spindles each having a clutch member normally disengaged from one of the first mentioned clutch members, means adapted to engage the upper rim of the receptacle for the drink being mixed for engaging any one of said spindle clutch members with one of the first mentioned clutch members to put that particular mixer spindle in operative engagement with the driving shaft, said means being operable by the drink receptacle, and an electric motor for driving the driving shaft with means in common to all of said spindles for starting said motor when any one of said spindle clutches are operatively engaged.

2. In a drink mixer, a driving shaft, a plurality of clutch members driven thereby, two mixer spindles each having a clutch member normally disengaged from one of the first mentioned clutch members, means for engaging either of said spindle clutch members with one of the first mentioned clutch members to put that particular mixer spindle in operative engagement with the driving shaft, an electric motor for driving the driving shaft, a normally open electric motor circuit, and means engaging the upper rim of the receptacle for the drink being mixed to close said circuit when said receptacle is placed in position relatively to either of said spindles.

3. In a drink mixer, a driving shaft, a plurality of clutch members driven thereby, a plurality of mixer spindles each having a clutch member normally disengaged from one of the first mentioned clutch members, means for engaging only one of said spindle clutch members with one of the first mentioned clutch members to put that particular mixer spindle in operative engagement with the driving shaft, an electric motor for driving the driving shaft, a normally open electric motor circuit, means in common to all said spindles to close said circuit by placing a receptacle in which the mixing is to occur in a mixing position relatively to any one of said spindles, said means including a circuit closer, a rock shaft therefor, a disk cover for said receptacle, and a connection between said cover and rock shaft.

4. In a drink mixer, a driving shaft, a plurality of clutch members driven thereby, a plurality of mixer spindles each having a clutch member normally disengaged from one of the first mentioned clutch members, means for engaging any one of said spindle clutch members with one of the first mentioned clutch members to put that particular mixer spindle in operative engagement with the driving shaft, an electric motor for driving the driving shaft, a normally open electric motor circuit, means in common to the several spindles to close said circuit by placing a receptacle in which the mixing is to occur in a mixing position relatively to any one of said spindles, a cover for said receptacle movement of which operates said last mentioned means when a receptacle is placed in position and means to support said receptacle in the mixing position.

FRANK T. GENTILE.